United States Patent [19]

Ryan et al.

[11] Patent Number: 4,598,176
[45] Date of Patent: Jul. 1, 1986

[54] TELEPHONE HANDSET CORD GUIDE AND RETAINER

[75] Inventors: Desmond J. Ryan; Friedrich Bertignoll, both of Ottawa, Canada

[73] Assignee: Northern Telecom Limited, Montreal, Canada

[21] Appl. No.: 619,042

[22] Filed: Jun. 11, 1984

[51] Int. Cl.⁴ .............................................. H04M 1/15
[52] U.S. Cl. ................................. 179/103; 179/100 R; 179/178; 339/101
[58] Field of Search ........... 179/178, 179, 103, 100 R, 179/184, 186, 147, 148 R, 148 F, 146 R, 149, 150, 151, 152, 153, 154; 339/101, 102 R

[56] References Cited

U.S. PATENT DOCUMENTS

| 2,048,865 | 7/1936 | Hufschmid | 179/148 F |
| 2,161,145 | 6/1939 | Du Pree et al. | 339/101 X |
| 2,416,984 | 3/1947 | Farr | 339/101 X |
| 2,521,043 | 9/1950 | Citso | 179/148 F |
| 2,588,986 | 3/1952 | Reynolds | 339/101 X |
| 3,333,084 | 7/1967 | Fagan | 339/101 X |

FOREIGN PATENT DOCUMENTS 0885869 8/1953 Fed. Rep. of Germany ... 179/148 F

Primary Examiner—Gene Z. Rubinson
Assistant Examiner—R. Vaas
Attorney, Agent, or Firm—Sidney T. Jelly

[57] ABSTRACT

Handsets for communications terminals can cause interference with operation of keyboards and the like because the handset cord can obstruct the keyboard when "on-hook". By clipping a cord guide and retainer on to the end of the handset, the cord can be guided to exit sideways. The cord guide and retainer is a channel-shaped member which snaps on to the end of the handset and has a recess into which the cord exits from the handset and from which the cord exits at one end through an aperture. The guide and retainer can be attached in either of two directions to cause the cord to exit to either side of the handset.

7 Claims, 7 Drawing Figures

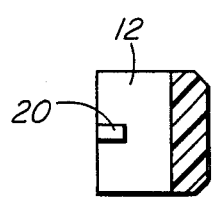
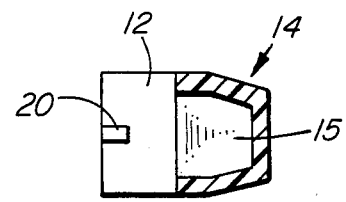
FIG. 5　　FIG. 6
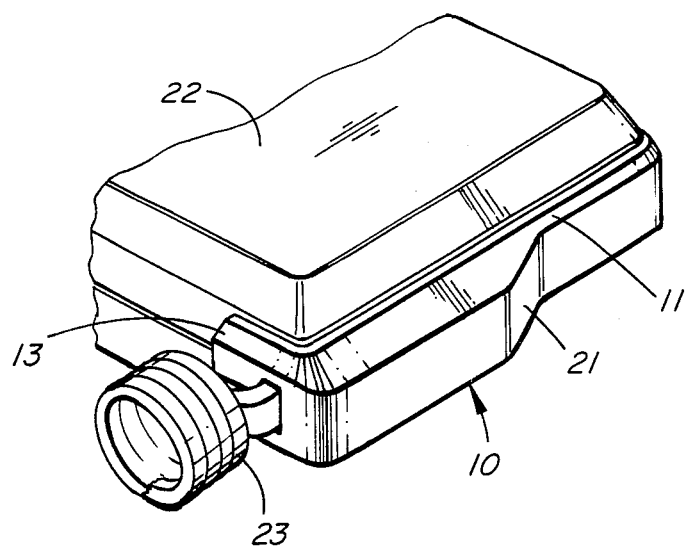
FIG. 7

TELEPHONE HANDSET CORD GUIDE AND RETAINER

This invention relates to a telephone handset cord guide and retainer, particularly intended for use with handsets which are used in conjunction with terminals which have a keyboard.

Communications terminals, such as those comprising a video screen and also a keyboard for inputting to the terminal, also generally have a telephone handset adjacent to the keyboard. This enables the terminal to be used as an ordinary telephone, or provides voice communication at the same time as the keyboard is in use. When the handset is in place, that is "on-hook", the handset cord can obstruct the keyboard, interfering with the operation of the keyboard.

The present invention provides a guide and retainer for the handset cord which clips on to the end of the handset and guides and retains the cord so that it exits to one side. Broadly, a handset cord guide and retainer comprises a channel-shaped member, adapted to fit around the end of a handset from which issues the handset cord, the retainer having means for engagement with the handset to keep the retainer in position, the retainer including a recessed portion which holds the cord as it exits from the handset and guides it across the end of the handset, to exit at one side. The retainer includes an aperture at one end through which the cord issues.

The invention will readily understood by the following description of an embodiment by way of example, in conjunction with the accompanying drawings, in which:

FIGS. 5 and 6 are cross-sections on the lines V—V and VI—VI respectively in FIG. 2; and FIG. 7 is a perspective view of the guide and retainer of FIGS. 1 to 6, attached to the end of a handset.

Figure 1:
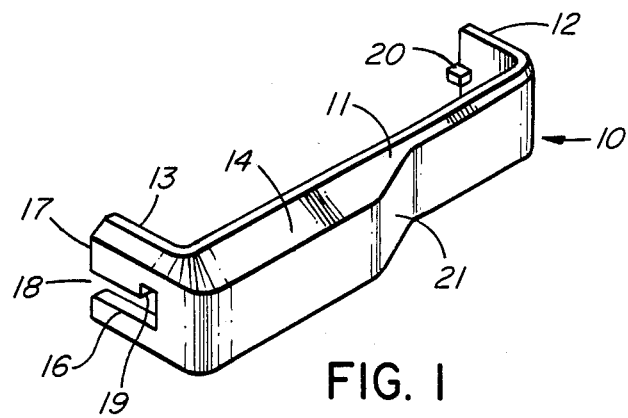
FIG. 1 is a perspective view of one form of guide and retainer.
Figure 2:
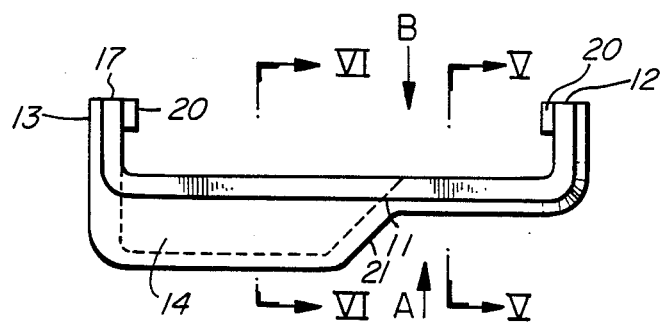
FIG. 2 is a top plan view of the guide and retainer.
Figure 3:
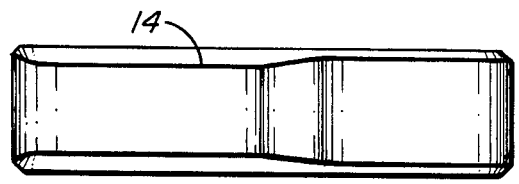
FIG. 3 is a side view in the direction of arrow A in FIG. 2.
Figure 4:
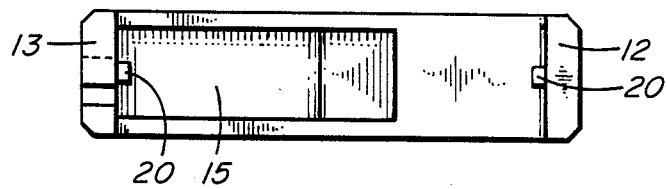
FIG. 4 is a view on the other side, in the direction of arrow B in FIG. 2.

As illustrated in FIGS. 1 to 6, a guide and retainer 10 is of channel shape, having a rear web portion 11 and two arms 12 and 13 extending forward from a front surface of the web portion. The web portion 11 is increased in thickness at one end, as indicated at 14. This portion is hollow, having a recess 15. The arm 13 which extends from the web portion at the thicker part, has an L-shaped slot 16 formed in it, extending in from the free edge 17. The leg 18 of the slot extends in the arm with the base 19 communicating with the recess 15. Each arm has an inwardly projecting rib 20 at its free end.

In a handset, the cord normally exits from the center of the end adjacent to the receiver. Thus the recess 15 is dimensioned to extend at least to, and possible slightly past the exit position. In use the guide and retainer is held adjacent to the end of the handset, and the cord pushed into the leg 18 of slot 16 and eased up unitl it is in the base 19. The guide and retainer is then clipped on to the handset. This is obtained by engaging the ribs 20 in apertures or recesses in the handset. One end, for example rib 20 on arm 12, can first be engaged in the aperture or recess, and then the guide and retainer rotated to push the arm 13 down the side of the handset until the rib 20 at that end engages in the related aperture or recess. The guide and retainer are capable of flexing to enable the arm 13 to move down the side of the handset.

Alternatively the guide and retainer can be attached by positioning it at the end of the handset with the free ends of both arms in contact with the handset, and then pushing the guide and retaining member to cause both arms to slide down the sides of the handset the arms flexing until the ribs engage. The guide and retainer can be removed, for example, by pushing on the inclined surface 21 at the end of the thicker portion 14, this releasing the rib 20 on arm 13 by flexing of arm 12. Alternatively a flat blade-like member can be pushed down between an arm and the handset side and the arm flexed away to release the rib.

The recess 15 is large enough to accommodate some extra cord, which can accumulate as the guide and retainer is attached to the handset. FIG. 7 illustrates a guide and retainer attached to the end of a handset 22, the handset cord indicated at 23. The guide and retainer can be attached to cause the handset cord to exit in either direction. In FIG. 7, the cord exits to the left, but by reversing the guide and retainer 10 on the end of the handset the cord can be caused to exit to the right.

Various modifications can be made. Thus instead of ribs 20 on the guide and retainer and holes or apertures in the handset, these can be reversed, with ribs or other projections on the handset and the holes or recesses in the guide and retainer. Also the shape of the guide and retainer 10 can be varied. The embodiment illustrated in the drawings is for a handset having a straight end surface. For a curved end surface the guide and retainer would be suitably shaped, and similarly for other shapes of handset.

What is claimed is:

1. A telephone handset cord guide and retainer comprising:
    a web portion having a front surface, and ends;
    an arm extending at each end of said web portion, the arms extending from said front surface and defining, with said web portion, a channel shape;
    said web portion incuding a portion of increased thickness extending along the web portion from one end of the web portion, the increased thickness extending in a direction away from said front surface;
    a recess extending into said portion of increased thickness from said front surface;
    an aperture extending through the arm at said one end, the aperture extending to said recess; and
    means on each arm for engagement with a handset housing to retain the cord guide and retainer on an end surface of the handset housing.

2. A guide and retainer as claimed in claim 1, said means for engagement with a handset housing comprising a rib at a free end of each arm, said ribs projecting towards each other.

3. A guide and retaaner member as claimed in claim 1, said portion of increased thickness having an inclined end surface intermediate said arms.

4. A guide and retainer member as claimed in claim 1, said aperture comprising a slot extending from a free end of the arm at said one end.

5. A guide and retainer member as claimed in claim 4, said slot being of L-shaped formation having a leg portion and a base, said leg portion extending from the free end of the leg and the base extending normal to the leg portion.

6. A telephone handset including a handset cord extending from an end thereof, and a handset cord guide and retainer attached to said end, said cord guide and retainer comprising a web portion having a front surface, and ends; an arm extending at each end of the web portion, the arms extending from said front surface and defining, with said web portion, a channel shape; said web portion including a portion of increased thickness extending along the web portion from one end of the web portion, the increased thickness extending in a direction away from said front surface; a recess extending into said portion of increased thickness from said front surface; an aperture extending through the arm at said one end, the aperture extending to said recess; means on said arms in engagement with means on said handset and retaining said cord guide and retainer in position on said end of said handset, the handset cord exiting from said end of said handset into said recess and out through said aperture.

7. A handset as claimed in claim 6, said means on said arms and said means on said handset comprising recesses in said handset and inwardly projecting ribs on said arms.

* * * * *